Jan. 16, 1940.  S. H. BENJAMIN  2,187,370
SAFETY RAZOR BLADE MAGAZINE
Filed May 4, 1939  3 Sheets-Sheet 1

INVENTOR
SIDNEY H. BENJAMIN
BY
ATTORNEY

Jan. 16, 1940. S. H. BENJAMIN 2,187,370
SAFETY RAZOR BLADE MAGAZINE
Filed May 4, 1939 3 Sheets-Sheet 2
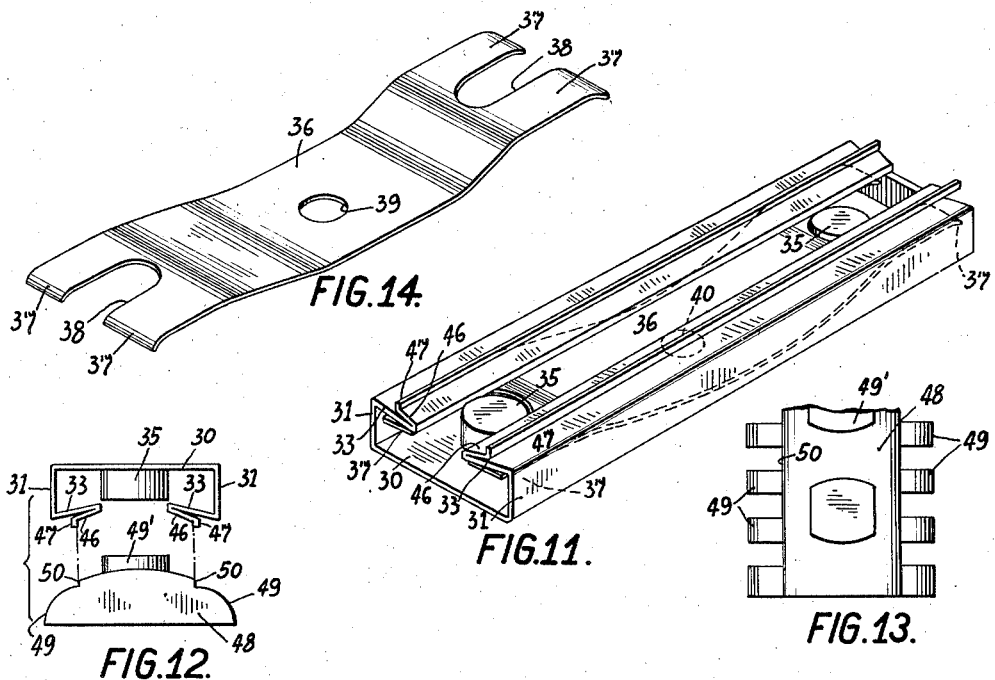
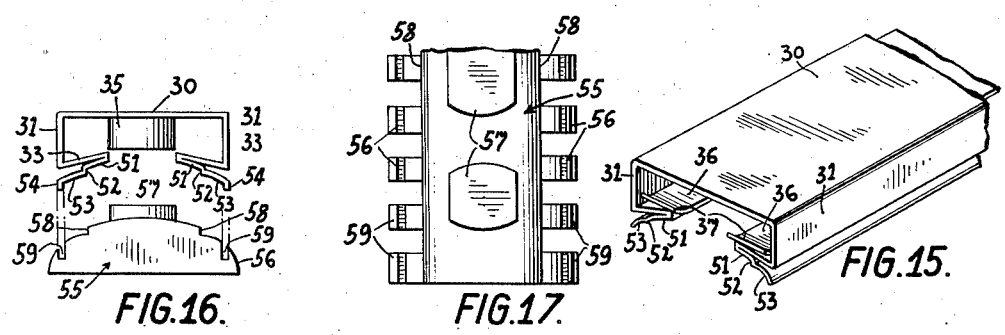
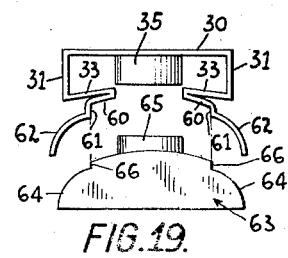
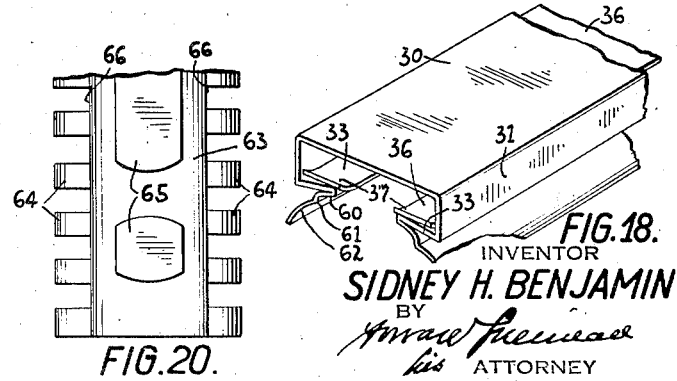
INVENTOR
SIDNEY H. BENJAMIN
BY
his ATTORNEY Jan. 16, 1940.   S. H. BENJAMIN   2,187,370
SAFETY RAZOR BLADE MAGAZINE
Filed May 4, 1939   3 Sheets-Sheet 3
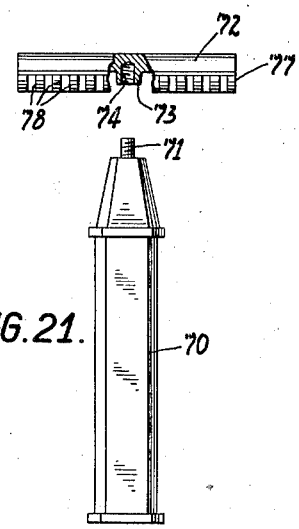
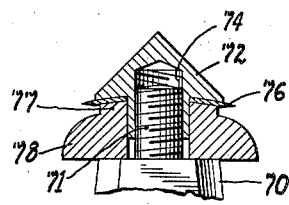
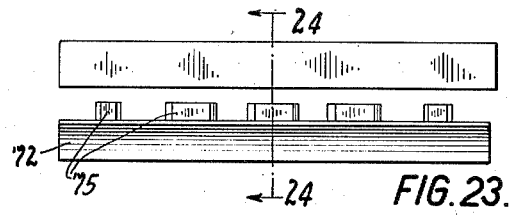
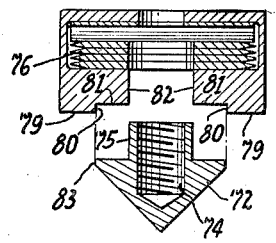
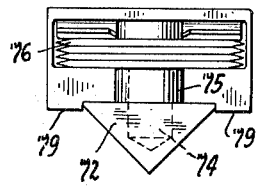
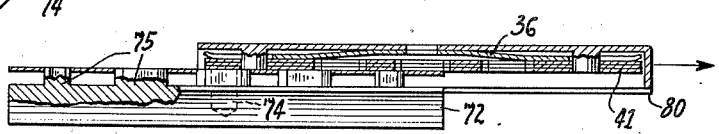
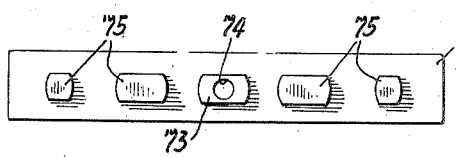
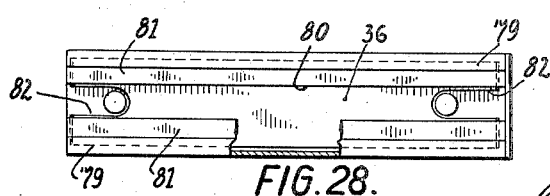
INVENTOR
SIDNEY H. BENJAMIN
BY
ATTORNEY Patented Jan. 16, 1940

2,187,370

UNITED STATES PATENT OFFICE 2,187,370

SAFETY RAZOR BLADE MAGAZINE

Sidney H. Benjamin, Milwaukee, Wis.

Application May 4, 1939, Serial No. 271,700

10 Claims. (Cl. 30—40)

My invention relates to safety razor blade magazines and their combinations with safety razor head elements, and refers particularly to such blade magazines being adapted to contain a plurality of stacked razor blades having either single or double cutting edges so constructed as to allow of the withdrawal of one blade while the remaining blades are retained within the magazine and in which the withdrawal means are elements of a safety razor head element.

The head elements of the usually employed safety razor comprise a cap and a guard having retaining means adapted to maintain a razor blade positioned between them, these retaining means usually comprising extended elements upon one head element adapted to extend through openings in a razor blade and then cooperating with a recess or receiving member in the other head element.

In the present generally employed methods for placing blades upon a head element of a safety razor it is necessary to manually handle the blade, thus frequently resulting in cutting the fingers, especially where two-edge blades are employed.

It is evident, therefore, that it would be of very considerable value if this danger could be eliminated and the blade deposited upon the required head element without the danger of subjecting the fingers to contact with the blade edges.

Another objection to most of the generally employed razor blade magazines adapted for the ejection, or withdrawal, of a single blade is the liability of the cutting edge to contact the inner face of the magazine during its ejection or withdrawal, thus dulling and injuring the cutting edge, and this is particularly the case when double edge blades are employed.

One of the objects of my invention is a razor blade magazine of such construction that the retaining members of a head element of a safety razor will withdraw a single blade therefrom without the danger of finger contact with a cutting edge and without the danger of contacting a cutting edge against the magazine, such withdrawal being accomplished without independent blade ejecting operating means being carried by the magazine.

In my specification, description of the accompanying drawings and claims, in referring to the head elements of a safety razor, I mean both the cap and the guard between which a blade is maintained, as the devices of my invention can be employed upon either of these elements which carries the extended studs, other extended portions or other elements for positioning the blade thereon.

In the accompanying drawings illustrating modified forms of the device of my invention, similar parts are designated by similar numerals.

Figure 1 is a side view of a safety razor having a handle 80', a cap 81', a guard 82' and a stud 83' carried by the cap 81' and capable of threaded engagement with the handle 80'.

Figure 11 is a perspective view of a modified form of my magazine.

Figure 12 is an end view of Figure 11 superimposed above a razor guard adapted for use therewith.

Figure 13 is a fragmentary top plan view of the guard of Figure 12.

Figure 14 is a perspective view of one form of a spring employed in my magazine.

Figure 15 is a fragmentary perspective view of a modified form of my magazine.

Figure 16 is an end view of the magazine of Figure 15 superimposed above a razor guard adapted for use therewith.

Figure 17 is a fragmentary top plan view of the guard of Figure 16.

Figure 18 is a fragmentary perspective view of a modified form of my device.

Figure 19 is an end view of the magazine of Figure 18 superimposed above a guard adapted for use therewith.

Figure 20 is a fragmentary top plan view of the guard of Figure 19.

Figure 21 is an exploded safety razor in which a stud carried by the handle is the connecting means between it, the cap and the guard, partly broken away for purposes of explanation.

Figure 22 is an enlarged, fragmentary central vertical section of the elements of the device of Figure 21 in connected position.

Figure 23 is an exploded side view of the razor head cap of Figures 21 to 23 and a safety razor blade magazine of my invention.

Figure 24 is a vertical section through the line 24—24 of Figure 23.

Figure 25 is an end view of Figure 24, with the parts brought together into operating position.

Figure 26 is a longitudinal section through the cap and the blade magazine, showing a blade partially removed therefrom.

Figure 27 is a top view of the cap of Figure 26.

Figure 28 is a top view of the magazine of Figure 26.

Figure 1:
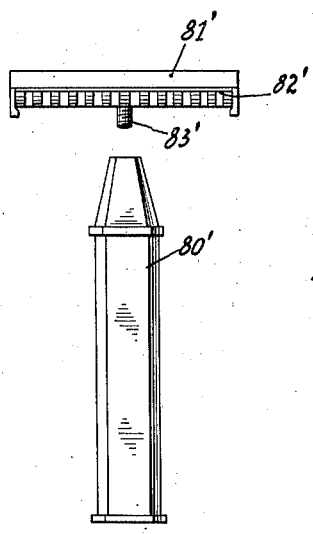
Figure 2:
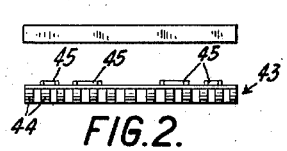
Figure 2 is a side view of a safety razor guard and a magazine of my invention superimposed thereover.
Figure 3:
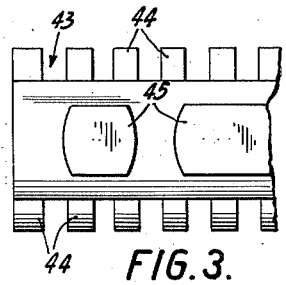
Figure 3 is a fragmentary top plan view of the guard of Figure 2.

The particular form of the blade magazine of my invention shown in Figures 1 to 10 comprises a bottom member 30, two side members 31, 31, an end member 32, and the two spaced top members 33, 33 extending inwardly toward each other from the side members 31, 31 and each having an outwardly extended guide member 34. Two blade positioning projections 35, 35 extend inwardly from the bottom member 30 and a flat spring 36 is attached to the central portion of the inner face of the bottom member 30, the extended end portions 37, 37 of the spring being resiliently pressed upwardly.

This particular form of spring is shown in Figure 14, in which each end portion 37, 37 has a recess 38 adapted to receive a blade positioning projection 35; the spring has also an opening 39 in alignment with the opening 40 of the bottom member 30.

The magazine is adapted to carry a plurality of razor blades 41, 41, so positioned therein that the spring 36 will press the plurality of aligned stacked blades against the inner faces of the top members 33, 33 with the blade positioning projections 35, 35 passing through aligned openings in the blades and with only the top blade positioned above the projections 35, 35. It is evident that with this construction the top blade is capable of being withdrawn through the open end 42 of the magazine, while the remaining blades will be retained in the magazine by the blade retaining projections 35, 35.

The blade magazine above described is shown as co-acting with a razor head guard 43, having teeth 44, 44 and the blade positioning extended studs 45, 45 designed to pass through openings within a blade to be positioned thereon.

Figure 4:
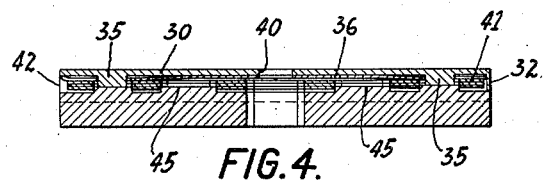
Figure 4 is an enlarged vertical longitudinal section of the guard of Figure 2 with one form of my magazine positioned thereon for purposes of withdrawing a blade therefrom.

Figure 4 shows the relative position of the magazine and the guard when it is desired to withdraw a single blade from the magazine.

Figure 5:
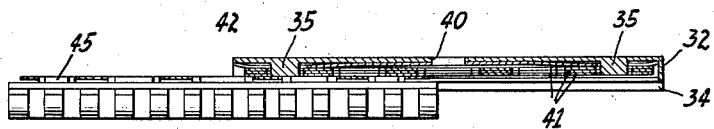
Figure 5 is similar to Figure 4 showing a partial withdrawal of a blade.
Figure 7:
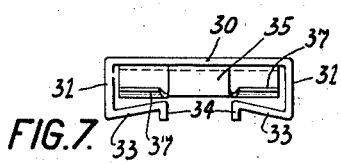
Figure 7 is an end view of Figure 6.
Figure 6:
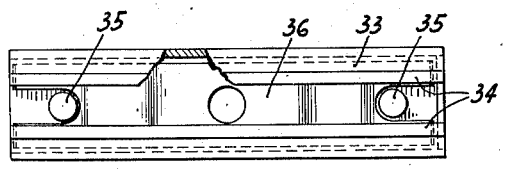
Figure 6 is a vertical longitudinal section of the magazine of Figure 4 with all blades withdrawn.
Figure 8:
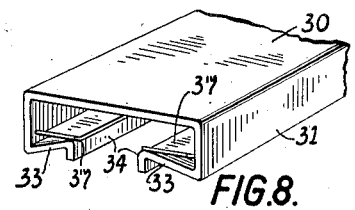
Figure 8 is a fragmentary perspective view of the device of Figure 7.
Figure 9:
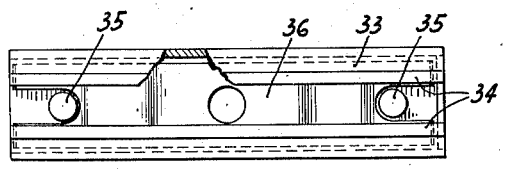
Figure 9 is a top view of the device of Figure 6.
Figure 10:
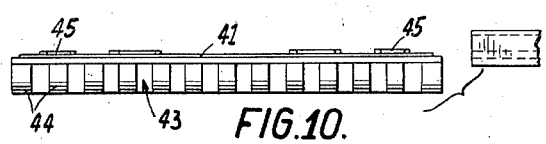
Figure 10 is a side view of Figures 4 and 5 with a blade completely withdrawn.

The studs 45, 45 of the guard pass through the openings in the exposed blade but are not long enough to pass through the openings in the remainder of the blades. If the magazine be drawn along the face of the guard as shown in Figure 5, it is evident that the studs 45, 45 will draw the exposed blade from the magazine, and that as it is withdrawn it is placed in position upon the guard, and that contact between the blade and the fingers of the operator is not necessary.

In the particular design shown, the end member 32 of the magazine is of such height as to allow of the withdrawal of a blade from either end of the magazine, but this end may be of sufficient height as to close that end of the magazine and prevent the withdrawal of a blade therefrom.

In order to insure that the movement of the guard and the magazine shall be in the direction of their longitudinal axes and thus prevent the blade edge from contacting the inner face of the magazine during the withdrawal of a blade, the members 34, 34 of the magazine will abut upon the outer faces of the studs 45, 45 and thus maintain a movement in the direction of said axes.

The modified form of a device of my invention shown in Figures 11, 12 and 13 is similar to the device shown in Figures 1 to 10, except that the top members 33, 33 are extended outwardly into the elements 46, 46 and then upwardly into the guide elements 47, 47. In order to insure the proper longitudinal movement of the magazine and the comb 48 having the teeth 49, 49, the studs 49', 49' and the shoulder 50 upon each side thereof, against which the guide members 47, 47 of the magazine will abut and move during the withdrawal movement.

The modified form of a device of my invention shown in Figures 15, 16 and 17 is similar to that shown in Figures 1 to 10 except that the top members 33, 33 are bent outwardly into the elements 51, 51, then upwardly 52, 52, outwardly 53, 53 and upwardly into the guide members 54, 54. In order to insure the proper longitudinal movement of the magazine and the comb 55, having the teeth 56, 56 and the studs 57, 57, the comb 55 has a shoulder 58, 58 on each side thereof against which the guide members 52, 52 will abut and move, and recesses 59, 59 extending along the teeth 56, 56 within which the guide members 54, 54 will move during the withdrawal movement.

The modified form of a device of my invention shown in Figures 18, 19 and 20 is similar to that shown in Figures 1 to 10 except that the top members 33, 33 are bent outwardly 60, 60, thence upwardly 61, 61, thence outwardly and downwardly forming the guide members 62, 62. During the withdrawal movement the members 61, 61 will abut upon the shoulders 66, 66 and the members 62, 62 will abut upon the teeth 64, 64.

It will thus be seen that the device of my construction comprises a magazine adapted to maintain a plurality of blades with means which will allow the removal of one blade therefrom while maintaining the remainder of the blades therein, the withdrawal of a blade therefrom being accomplished by a safety razor head element, with means carried by the magazine and co-acting with said head to insure a longitudinal movement of the magazine and head element during the removal motion.

It will be noted that an independent movable ejecting means carried by the magazine is not necessary in the withdrawal of a blade from my magazine, the withdrawal of a blade being accomplished by simply placing my magazine upon a safety razor head element and moving them longitudinally with respect to each other.

I have shown my magazine as operative with a guard head element of a safety razor, but it is evident that it may be also employed with a cap head element of a safety razor carrying blade retaining members, as these retaining members will operate to withdraw a blade from my magazine, irrespective of whether they are situated upon the cap or the guard.

Figures 21 to 28 refer to a safety razor construction comprising the handle 70 having the extended threaded stud 71, a cap 72 having an extended boss 73 with an internally threaded recess 74 adapted to mesh with the stud 71 and a plurality of blade positioning studs 75, 75 adapted to pass through openings in a blade 76 and be positioned within corresponding positioned recesses within the guard 77 having a plurality of teeth 78.

One form of a blade magazine of my invention adapted to co-operate with a safety razor cap of the character described is shown in Figures 24 to 28.

The interior construction of this magazine is similar to that previously described, but in this modified form, each of the two spaced top members 79 is bent to form the members 80, 81 and 82, the member 80 of which will abut upon and move along the angular edge 83, and the member 82 of which will abut upon and move along the studs 75, 75 of the cap 72, thus insuring that the magazine will move longitudinally along the cap, when the two elements are caused to cooperate to remove a blade from the magazine.

I do not limit myself to the specific size, shape, number or arrangement of parts as shown and described as these are mentioned solely for the purpose of clearly describing the devices of my invention.

What I claim is:

1. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade, said device being adapted to cooperate with studs upon a razor head element to withdraw the top blade only by a longitudinal movement of said magazine and said razor head element with respect to each other.

2. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, stud means carried by said magazine and adapted to extend through the openings in all of said blades with the exception of the top blade, said device being adapted to cooperate with studs upon a razor head element to withdraw the top blade only by a longitudinal movement of said magazine and said razor head element with respect to each other, and guide means carried by said magazine to maintain said magazine and said razor head element in longitudinal position with respect to each other during said movement.

3. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade and to retain all said blades with the exception of the top blade within said magazine during the withdrawal of the top blade, said device being adapted to cooperate with studs upon a razor head element to withdraw the top blade only by a longitudinal movement of said magazine and said razor head element with respect to each other.

4. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade and to retain all said blades with the exception of the top blade within said magazine during the withdrawal of the top blade, and resilient means forcing the blade stack upwardly to allow of the withdrawal of the top blade, said device being adapted to cooperate with studs upon a razor head element to withdraw the top blade only by a longitudinal movement of said magazine and said razor head element with respect to each other.

5. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, stud means carried by said magazine and adapted to extend through the openings in all of said blades with the exception of the top blade and to retain all said blades with the exception of the top blade within said magazine during the withdrawal of the top blade, and resilient means forcing the blade stack upwardly to allow of the withdrawal of the top blade, said device being adapted to cooperate with studs upon a razor head element to withdraw the top blade only by a longitudinal movement of said magazine and said razor head element with respect to each other, and guide means carried by said magazine to maintain said magazine and said razor head element in longitudinal position with respect to each other during said movement.

6. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade, and a razor head element carrying studs adapted to enter the openings in the top blade only and allow the withdrawal of said top blade by a longitudinal movement of said magazine and said razor head element with respect to each other.

7. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, stud means carried by said magazine and adapted to extend through the openings in all of said blades with the exception of the top blade, and a razor head element carrying studs adapted to enter the openings in the top blade only and allow the withdrawal of said top blade by a longitudinal movement of said magazine and said razor head element with respect to each other, and guide means carried by said magazine to maintain said magazine and said razor head element in longitudinal position with respect to each other during said movement.

8. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade and to retain all said blades with the exception of the top blade within said magazine during the withdrawal of the top blade, and a razor head element carrying studs adapted to enter the openings in the top blade only and allow the withdrawal of said top blade by a longitudinal movement of said magazine and said razor head element with respect to each other.

9. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade and to retain all said blades with the exception of the top blade within said magazine during the withdrawal of the top blade, and resilient means forcing the blade stack upwardly to allow of the withdrawal of the top blade, and a razor head element carrying studs adapted to enter the openings in the top blade only and allow the withdrawal of said top blade by a longitudinal movement of said magazine and said razor head element with respect to each other.

10. A safety razor blade magazine comprising a receptacle the width of which is greater than the width of a razor blade and having a longitudinal slot therein narrower than the width of said receptacle and of said blade and adapted to receive a plurality of stacked safety razor blades, each having a plurality of openings therethrough, one end of said magazine being open to allow of the withdrawal of one of said blades, and stud means carried by said magazine and adapted to extend through the openings in all of said blades with the exception of the top blade and to retain all said blades with the exception of the top blade within said magazine during the withdrawal of the top blade, and resilient means forcing the blade stack upwardly to allow of the withdrawal of the top blade, and a razor head element carrying studs adapted to enter the openings in the top blade only and allow the withdrawal of said top blade by a longitudinal movement of said magazine and said razor head element with respect to each other, and guide means carried by said magazine to maintain said magazine and said razor head element in longitudinal position with respect to each other during said movement.

SIDNEY H. BENJAMIN.